(No Model.)
B. LOOMIS.
PROCESS OF MANUFACTURING GAS.
No. 404,209. Patented May 28, 1889.
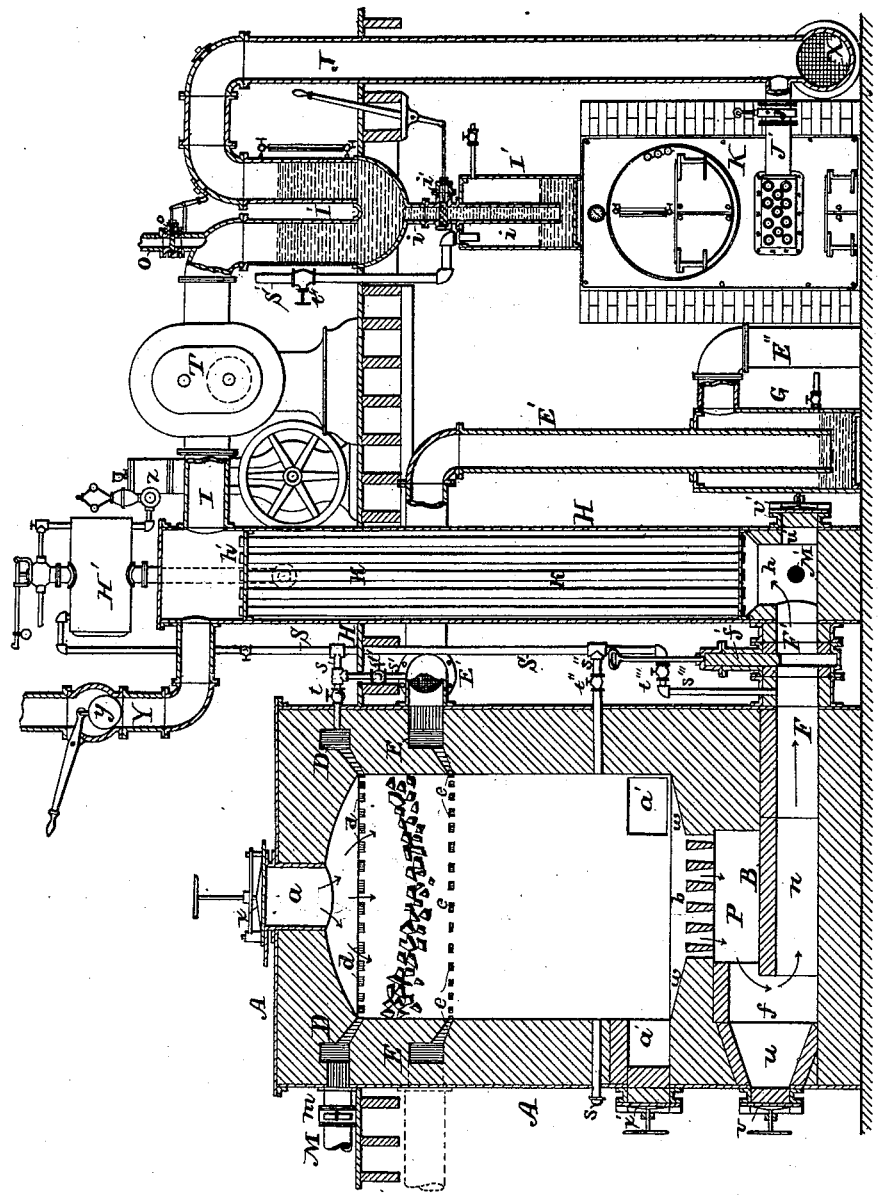
Witnesses:
Geo. G. Penney.
W. E. T. Norton
Inventor.
Burdett Loomis
By E. B. Clark
Atty.

UNITED STATES PATENT OFFICE.

BURDETT LOOMIS, OF HARTFORD, CONNECTICUT.

PROCESS OF MANUFACTURING GAS.

SPECIFICATION forming part of Letters Patent No. 404,209, dated May 28, 1889.

Application filed February 23, 1889. Serial No. 300,877. (No model.)

*To all whom it may concern:*

Be it known that I, BURDETT LOOMIS, a citizen of the United States, residing at Hartford, in the county of Hartford and State of Connecticut, have invented certain new and useful Improvements in Process of Manufacturing Gas; and I do hereby declare the following to be a full, clear, and exact description of the invention, such as will enable others skilled in the art to which it appertains to make and use the same.

This invention relates to the process of manufacturing a high-grade heating or fuel gas adapted for heating glass-furnaces, pottery-kilns, forges, steam-boilers, metallurgic and other furnaces, and for motive power in gas-engines.

The object of my invention is to improve the combustion and gasification of a body of fuel, particularly bituminous coal and slack, by means of downward drafts of air; also, to generate heating-gas of improved quality by decomposing steam during combustion and gasification of the fuel with downward air-currents, whereby carbonic oxide and hydrogen resulting from the decomposed steam are mingled with the gaseous products resulting from the combustion of the fuel with air and the operation of generating high-grade heating-gas in a single generator made continuous.

In carrying out my invention either air alone or air and steam together are drawn down into and through the body of ignited fuel, and the resulting mixed gas is drawn down and out at the bottom of the fuel, whereby bituminous coal or slack when used is much better coked, the oily and tarry matter distilled from the fresh top layers of such coal or slack are converted into fixed gas by passage through the heated fuel below, and whereby the generator may be opened at the top and supplied with coal and the fire inspected and arranged in the generator while the exhauster is in operation, and the generation of gas proceeds without any danger and delay caused by flame and smoke being blown into the operator's face.

I pass the highly-heated gases from the base of the generating-furnace through a tubular or other cooler and utilize their heat for heating water or air, and thus cool the gases to such a degree that they will not injure the exhauster in passing through it.

A suitable apparatus for carrying out my improved process is illustrated in the accompanying drawing, which represents a vertical section thereof.

The generating-furnace A is built, preferably, of fire-brick, and covered in the usual way with an outer iron jacket. It is provided at the top with a fuel-opening, $a$, closed by lid $x$. Passages $a'$ and doors $x'$ are provided at the bottom of the fuel-chamber above the grate. An inclined hearth or floor, $w$, extends inward from the walls, and is formed with a central opening, into which is set the grate $b$. The ash-pit P is of about the same horizontal dimensions as the grate-opening, and has a brick or tile floor, B, which is supported upon parallel division-walls $n$, built in the wide outlet-flue F in the base of the furnace. A passage-way, $f$, leads from the ash-pit into flue F. The take-off pipe F', having valve $f'$, connects flue F with box $h$ at the base of the tubular gas-cooler and water-heater H. Passages $u$ and $u'$, having doors $v$ and $v'$, are provided for removing dust and ashes. The hot gases in passing off through flue F heat the brick division-walls $n$, which are set a short distance apart for the passage of gas, and the heat thus stored is subsequently utilized for superheating steam which is admitted into the base of the generator when making water-gas.

In the wall of the generator, near its top, is formed an annular flue, D, which is connected by ports or tuyeres $d$ with the interior of the generator. An air-supply pipe, M, having valve $m$, connects with the flue D, and air may be supplied to the fuel through such flue and pipe; but in practice these are not generally required, as satisfactory results are produced by simply partially opening lid $x$ and admitting air to the fuel through passage $a$. Fuel can be fed to the generator at the same time that the air is admitted.

A short distance above the middle portion of the fuel-chamber an annular flue, E, and connecting ports or tuyeres $e$ are formed in the wall, so as to take off gas or admit steam below the top of the coal. A steam-supply pipe, S, which may lead from drum H' or other source, connects by branch $s$, having valve $t$, with flue D, by branch $s'$, having valve $t'$, with gas-pipe E', and flue E by branch pipes $s''$, having valve $t''$, with the lower portion of the fuel-chamber above the grate, and by branch pipe $s'''$, having valve $t'''$, with pipe F' and flue F below the ash-pit. By means of these pipes steam is admitted either at bottom or top of the generator and is passed either up or down through the fuel. During the admission of the air-draft and generation of producer-gas a limited supply of steam is admitted through flue D and ports $d$ or flue E and ports $e$ and passed down through the fuel for decomposition and conversion into water-gas, which adds to the value and heating-power of the producer-gas resulting from combustion of the fuel with air. The eduction-pipe E' for water-gas connects with flue E and extends down into seal-box G, where its lower end dips into the liquid and is sealed. Pipe E'' conducts gas from box G to the holder or place of use.

The vertical tubular gas-cooler H is provided in the usual way with boxes $h\ h'$, respectively at bottom and top thereof, and with tubes $k$, extending between such boxes. An air-supply pipe, M', may connect with box $h$. Water or air may be circulated through the cylinder H and around tubes $k$ for cooling the gas, or by controlling the supply of water steam may be generated and passed up into drum H'. A smoke-stack, Y, having ball-valve $y$, connects with box $h$ for escape of gas or smoke by natural draft when the exhauster is not running.

Pipe I, for taking off producer-gas or mixed producer and water gas, connects box $h'$ with the rotary exhauster T, and beyond the exhauster pipe I connects with the U-shaped trap or seal I', from which pipe J leads down to main X, which may connect with a holder and directly with a heating-furnace. (Not here shown.) A branch pipe, J', having valve $j$, connects with a burner in steam-boiler furnace K. The fluid seal-chamber I' has at the bottom a liquid drain and supply pipe, $i$, having valve $i'$ and extending down into box I''. A steam-pipe, S', having valve $t^4$, connects with the top of box I''. By such pipe steam is forced into box I'' and serves to force the liquid from the box up through pipe $i$ into the U-shaped seal-chamber I' for stopping the flow of gas in pipe I or the back flow of gas from pipe J. The liquid having been forced up into seal-chamber I', valve $i'$ may be closed, so as to retain the liquid without the continued use of steam-pressure. Compressed air may be used instead of steam for forcing liquid up into the seal-chamber. Other forms of seal or stop valve may be used. A vent-pipe, O, having valve $o$, is applied to pipe I. The exhauster is driven by engine Z.

Only moderately-sized holders are required to store the excess of gas generated at one time or to supply any deficiency that may occur at another time. They also serve to regulate the flow of gas to the furnaces.

In order to operate my apparatus, a fire is kindled on the grate and supplied with fuel till a deep bed of ignited fuel is formed. When a sufficient body of fuel is ignited, the exhauster is started, drawing air down into the fuel, and the resulting producer-gas is conducted to a holder or to a furnace, where it is burned. Bituminous coal in lump or slack form is gradually fed in till it nearly fills the furnace, and the exhauster is kept running as long as it is desired to make producer-gas. After the fuel becomes highly heated a limited supply of steam is admitted by pipe $s$, through flue D and ports $d$ or through flue E and ports $e$, into the fuel, where it is decomposed to form water-gas, which mixes with the producer-gas resulting from the combustion of the coal with air admitted through passage $a$ or flue D.

When I wish to make mixed producer and water gas continuously, I preferably admit air alone at the top or above the fuel, so as to produce good combustion, and the hot gaseous products are passed down, and at the same time admit steam at a point from twelve to eighteen inches below the top of the fuel—as through flue E and ports $e$—so that it comes directly into contact with incandescent fuel and is decomposed, and does not interfere with the proper combustion of the fuel with air. The heat is thus better maintained, steam is more effectively decomposed, and better results secured. Fresh coal is added at the top as required, and the oily and tarry vapors distilled therefrom are drawn by the exhauster down through the hot fuel below and converted into fixed carbureted-hydrogen gas, which greatly adds to the heating-power of the producer-gas and prevents condensation and waste in the mains, &c. Steam, when passed down with the air, is quite readily and thoroughly decomposed, in conjunction with the volatile hydrocarbon vapors distilled from the coal, as they come in contact with the incandescent fuel, the oxygen of the steam combining with the carbon of the vapors forming carbonic oxide, while the hydrogen of both the hydrocarbon vapors and of the steam is set free, thus utilizing to the best advantage all the valuable constituents of the coal. The hot gas going off from the base of the generator highly heats the brick-work in the ash-pit and the brick division-walls $n$ in flue F. It is cooled in passing through tubular cooler H, so that it will not injure the exhauster in passing through it. While generating producer-gas or mixed producer and water gas lid $x$ is partly open, valve $f'$ is open, and the liquid is run out of seal-chamber I', stack-valve $y$ is closed, and the exhauster is kept running.

When it is desired to make water-gas alone and a deep body of incandescent coal has been formed, lid $x$ and valve $f'$ are closed, seal-chamber I' is closed, and the exhauster is stopped. Steam is now admitted by pipe $s'''$ into flue F, where it is superheated by the hot brick-work, and then passes up into the incandescent fuel, where it is decomposed into hydrogen and carbonic oxide, commonly known as "water-gas." This gas passes out through ports $e$ and flue E into outlet-pipes E'. Hydrocarbon vapors distilled from the fresh coal above ports $e$ pass down into the more highly-heated fuel below and are converted into fixed carbureted hydrogen, which passes off with the water-gas and adds largely to its heating-power. This enriched water-gas may be stored in a separate holder or conducted directly to a place of use. It is especially adapted for use in fine work where a high heat is required, and in practice gives excellent results. Steam may be admitted to the furnace by pipe $s''$ when desired, instead of pipe $s'''$.

When the heat of the fuel becomes too low to properly decompose steam, it is shut off, the valves are properly adjusted, the lid opened, and the exhauster started for again heating the fuel to incandescence, after which the manufacture of water-gas is resumed in the manner above described.

While operating the exhauster fresh coal is fed to the furnace as required. In practice a number of generators may be used, so that both kinds of heating-gas can be continuously generated and used.

Producer and water gas made separately, as above described, may be mixed together in the main or holder or at the place of use in a heating-furnace for producing a higher heat than could be obtained from the producer-gas alone.

In operating according to my process for manufacturing gas, cheap low-grade fuel—such as bituminous coal-slack or a mixture of bituminous and anthracite slack or coke dust—could be advantageously used and rapidly and uniformly gasified. The furnace can be conveniently charged and the fresh fuel so placed as to prevent the formation of holes or channels through the bed of fuel, since the attendant can readily work over the top of the furnace and inspect its interior through the fuel-opening by reason of the smoke and gases being drawn away from the top opening and down through the furnace by the exhauster. Dust and ashes are blown or drawn into the ash-pit by the downdraft, whereby the formation of clinker in the fuel-chamber is practically prevented.

Having now particularly described and ascertained the nature of my said invention and in what manner the same is to be performed, I declare that what I claim is—

1. The process of generating heating or fuel gas, which consists in drawing both air and steam down into and through a body of ignited fuel, thereby causing combustion of the fuel with formation of producer-gas and decomposition of the steam with formation of water-gas, causing vapors distilled from the upper layers of coal to pass into the heated fuel below for conversion into fixed gas, and drawing the resulting mixed gases down through the fuel and out at the bottom of the generator, whereby the fuel may be supplied and arranged in the generator while the exhauster is in operation without any danger and delay caused by flame and smoke being blown into the operator's face, and also whereby the coal may be better coked and converted into gas.

2. The process of generating heating or fuel gas, which consists in admitting air to the top of a bed of ignited fuel for causing combustion thereof, and at the same time admitting steam into the more highly-heated fuel below the top, and drawing both the air and steam down into and through the heated fuel, thereby causing combustion of the fuel with formation of producer-gas and decomposition of the steam with formation of water-gas, causing vapors distilled from the upper layers of coal to pass into the heated fuel below for conversion into fixed gas, and drawing the resulting mixed gases down through the fuel and out at the bottom of the generator, whereby the fuel may be supplied and arranged in the generator while the exhauster is in operation without any danger and delay caused by flame and smoke being blown into the operator's face, and also whereby the coal may be better coked and converted into gas.

In testimony whereof I affix my signature in presence of two witnesses.

BURDETT LOOMIS.

Witnesses:
JOSEPH S. WOODRUFF,
WILLIAM R. LOOMIS.